Patented May 3, 1932

1,856,684

UNITED STATES PATENT OFFICE

HEINRICH ZIEGNER, OF HAGEN, GERMANY

POROUS BODY AND PROCESS OF MANUFACTURING THE SAME

No Drawing. Application filed November 17, 1927, Serial No. 234,028, and in Germany January 14, 1927.

My invention relates to improvements in porous bodies and the process of manufacturing the same, and the object of the improvements is to provide a body which has a high porosity, which is either rigid or flexible, which can be manufactured in any desired form, and which can be used as a separating member in primary or secondary electric elements, as a diaphragm in electrolytic cells, as a filtering member, and for various other purposes. Another object of the improvements is to provide a process by means of which different degrees of porosity can be imparted to the body. With these and other objects in view my invention consists in the matters to be described hereinafter and particularly pointed out in the appended claims.

My improved porous body consists of small particles or grains of porous material such for example as wood in the form of sawdust or meal, pumice, and the like, and a suitable binding medium connecting the said grains into a coherent mass, which binding medium coats only parts of the surfaces of the grains so as to produce coherent interstices between the same extending to the surface of the body. The binding medium consists of substances of the character of rubber such for example as rubber, guttapercha, balata subjected or not to soft or hard vulcanization, and intermingled if desired with the usual filling media such as factice, chalk or lithopone. By thus coating the grains only at parts of their surfaces with the binding medium numerous interstices are produced which connect the grains with one another and extend through the whole body and to the surface thereof. Thus the porosity of the body is based on the porosity of the individual grains and the said numerous interstices, and it is so great that the body is suitable for use as a separator in primary or secondary electric elements, diaphragms for electrolytic cells, filters and the like. If vulcanized the bodies have a high strength, and according to the degree of the vulcanization of the binding medium they are either rigid or flexible. Their resistance against chemical influences depends on the character of the binding medium and the porous bodies. Where a high chemical resisting power is desired the porous grains consist of pumice.

In the manufacture of the body I proceed as follows:

The porous grains are first imbued with a liquid such as gasoline capable of swelling the binding medium, whereupon they are rapidly mixed with a body of the character of rubber, preferably rubber having a suitable vulcanizing medium such as sulphur added thereto. In many cases the said rubber is used in mixture with suitable filling matter such as lithopone, chalk or factice. The grains and rubber are intermingled by known methods, for example by means of mixing rollers. I have found that by first imbuing the grains with gasoline or the like the mass of grains which can be added to the rubber is largely increased as compared to a process in which the grains are not imbued with gasoline, because the gasoline partly diffusing into the rubber or the like causes the latter to swell on the surfaces of the grains, so that the amount of rubber needed for coating the surfaces of the grains is considerably reduced as compared to the non-swollen rubber. By drying the mixture the volatile swelling medium is vaporized, so that the body of rubber or the like is contracted, and the films of rubber coating the grains are torn and partly separated from the grains, thus producing the interstices connecting the porous grains and extending to the surface of the body. The pourous body thus produced can be used for many purposes without being vulcanized. But in most cases I prefer to increase the strength of the body by subjecting the same to hard or soft vulcanization.

If it is desired to obtain a body of particularly high porosity I imbue the body before or during vulcanization with a liquid medium such as water, which is not capable of causing the rubber or the like to swell, the said medium being vaporized as vulcanization proceeds, so that the pressure produced by the said vaporization further enlarges the interstices. For thus imbuing the body with water I put the same into a body of water and heat the said water sufficiently for vulcanizing the rubber.

The porosity of the body can be further increased by mixing the grains before adding thereto gasoline or the like with finely divided matter adapted to be swollen by water, such for example as potato flour or starch, imbuing the body with water, and afterwards removing therefrom the said matter. The mixture of the grains and the said matter is treated in the same way as has been described above. In my opinion the potato flour or starch is absorbed by the grains when being inbued with gasoline, and during vulcanization in water the potato flour or starch is swollen, thus enlarging the interstices existing between the rubber and the grains. After the skeleton of rubber has hardened the flour or starch is transformed upon continued vulcanization of the rubber into dextrin, which is dissolved in water and removed from the body. Should the dextrin not be completely removed at the end of the vulcanization it can be readily removed by washing the body in water.

*Example.*—To a mixture of 100 parts of rubber, 7½ parts of sulphur, 0,5 parts of an accelerator, 50 parts of lithopone, 75 parts of chalk, 200 parts of sawdust and 100 parts of gasoline are admixed on the rollers, the product being drawn out if desired on the calender into foils of any desired thickness, which foils are dried and vulcanized ¼ hour in steam at a pressure of 5½ atmospheres.

If a body of increased porosity is desired the foils are vulcanized in hot water at the same pressure.

If bodies of particularly high porosity are desired I add 150 parts of potato flour to the 200 parts of sawdust, the amount of the other components and the treatment being the same. Also in this case the body is vulcanized in hot water at the same pressure.

I claim:

1. The herein described process of manufacturing porous bodies, which consists in imbuing porous particles with a medium adapted to swell matter of the character of rubber, intermingling the said porous particles with matter of the character of rubber, and causing contraction of the matter of the character of rubber surrounding the said porous particles by vaporization of the medium passed into the same from said particles.

2. The herein described process of manufacturing porous bodies, which consists in imbuing porous particles with gasoline, intermingling the said porous particles with matter of the character of rubber, and causing contraction of the matter of the character of rubber surrounding said particles by vaporization of the gasoline passed into the same from said particles.

3. The herein described process of manufacturing porous bodies, which consists in imbuing porous particles with a medium adapted to swell matter of the character of rubber, intermingling the said porous particles with matter of the character of rubber and filling matter, and causing contraction of the matter of the character of rubber surrounding said particles by vaporization of the medium passed into the same from said particles.

4. The herein described process of manufacturing porous bodies, which consists in imbuing porous particles with a medium adapted to swell matter of the character of rubber, intermingling the said porous particles with matter of the character of rubber and vulcanizing matter, causing contraction of the matter of the character of rubber surrounding said particles by vaporization of the medium passed into the same from said particles, and heating the mixture at vulcanizing temperature.

5. The herein described process of manufacturing porous bodies, which consists in imbuing porous particles with a medium adapted to swell matter of the character of rubber, mixing the said porous particles with matter of the character of rubber and vulcanizing matter, causing contraction of the matter of the character of rubber surrounding said particles by vaporization of the medium passed into the same from said particles, imbuing the mixture with water, heating the mixture at vulcanizing temperature, and vaporizing the water.

6. The herein described process of manufacturing porous bodies, which consists in imbuing porous particles with a medium adapted to swell matter of the character of rubber, intermingling the said porous particles with matter of the character of rubber and vulcanizing matter, causing contraction of the matter of the character of rubber surrounding said particles by vaporization of the medium passed into the same from said particles, imbuing the mixture with water, heating the mixture in water at vulcanizing temperature, and vaporizing the water.

7. The herein described process of manufacturing porous bodies, which consists in mixing porous particles with matter capable of swelling in water, adding to the mixture a liquid capable of causing matter of the character of rubber to swell, adding to the said mixture matter of the character of rubber, vaporizing the matter capable to swell the matter of the character of rubber, imbuing the mixture with water, and removing the matter capable of swelling in water.

8. The herein described process of manufacturing porous bodies, which consists in mixing porous particles with matter capable of swelling in water, adding to the mixture a liquid capable of causing matter of the character of rubber to swell, adding to the mixture matter of the character of rubber, vaporizing the matter capable to swell the matter of the character of rubber, imbuing the mixture with water, and removing the matter capable of swelling in water by washing.

9. The herein described process of manufacturing porous bodies, which consists in mixing porous particles with matter capable of swelling in water, adding to the mixture a medium capable of causing matter of the character of rubber to swell, adding to the said mixture matter of the character of rubber and vulcanizing matter, vaporizing the medium capable to swell the matter of the character of rubber, imbuing the mixture with water, heating the mixture in water at vulcanizing temperature, and removing the matter capable of swelling in water.

10. The herein described process of manufacturing porous bodies, which consists in mixing porous particles with potato flour, adding to the mixture a medium capable of causing matter of the character of rubber to swell, adding to the said mixture matter of the character of rubber and a vulcanizing matter, vaporizing the matter capable to swell the matter of the character of rubber, imbuing the mixture with water, heating the same at vulcanizing temperature, and removing the matter capable of swelling in water.

11. The herein described process of manufacturing porous bodies, which consists in imbuing disintegrated wood particles with a medium adapted to swell matter of the character of rubber, intermingling the said particles with matter of the character of rubber, and causing contraction of the matter of the character of rubber surrounding the said wood particles by vaporization of the medium passed into the same from said particles.

12. The herein described process of manufacturing porous bodies, which consists in imbuing porous particles with a medium adapted to swell rubber, intermingling the said porous particles with rubber, and causing contraction of the rubber surrounding the said porous particles by vaporization of the medium passed into the same from said particles.

13. The herein described process of manufacturing porous bodies, which consists in imbuing porous particles with a medium adapted to swell rubber, intermingling the said porous particles with rubber and vulcanizing matter, causing contraction of the rubber surrounding the said particles by vaporization of the medium passed into the same from said particles, and heating the mixture at vulcanizing temperature.

14. The herein described process of manufacturing porous bodies, which consists in imbuing porous particles with a medium adapted to swell rubber, mixing the said porous particles with rubber and vulcanizing matter, causing contraction of the rubber surrounding said particles by vaporization of the medium passed into the same from said particles, imbuing the mixture with water, heating the mixture at vulcanizing temperature, and vaporizing the water.

15. The herein described process of manufacturing porous bodies, which consists in mixing porous particles with matter capable of swelling in water, adding to the mixture a liquid capable of causing rubber to swell, adding to the said mixture rubber, causing contraction of the rubber surrounding said particles by vaporization of the matter passed into the same from said particles, imbuing the mixture with water, and removing the matter capable of swelling in water.

16. The herein described porous body containing small porous particles, and a binding medium of the character of vulcanized rubber coating parts of the surfaces of said particles and leaving other parts bare, the interstices provided at the bare parts communicating with one another so as to produce minute passages extending through the whole body.

17. The herein described porous body containing small porous particles, and vulcanized rubber connecting the said particles and coating parts of the surfaces of said particles and leaving other parts bare, the interstices provided at the bare parts communicating with one another so as to produce minute passages extending through the whole body.

18. The herein described porous body containing disintegrated wood, and a binding medium of the character of vulcanized rubber connecting the wood particles and coating parts of the surfaces of said wood particles and leaving other parts bare, the interstices provided at the bare parts communicating with one another so as to produce minute passages extending through the whole body.

19. The herein described porous body, which contains particles of disintegrated wood, and vulcanized rubber connecting the said particles and coating parts of the surfaces of the particles and leaving other parts bare, the interstices provided at the bare parts communicating with one another so as to produce minute passages extending through the whole body.

In testimony whereof I hereunto affix my signature.

HEINRICH ZIEGNER.